United States Patent [19]
Nishikawa et al.

[11] Patent Number: 6,001,526
[45] Date of Patent: Dec. 14, 1999

[54] BINDER CARRIER CONTAINING ETHYLENIC UNSATURATED NITRILE COPOLYMER AS BINDER RESIN

[75] Inventors: Tomoharu Nishikawa, Hirakata; Makoto Kobayashi, Kobe; Koichi Takenaka, Itami; Hideaki Yasunaga, Sakai; Hiroyuki Fukuda, Sanda, all of Japan

[73] Assignee: Minolta Co., Ltd., Osaka, Japan

[21] Appl. No.: 09/274,106

[22] Filed: Mar. 23, 1999

[30] Foreign Application Priority Data

Mar. 24, 1998 [JP] Japan .................................. 10-075382
Mar. 24, 1998 [JP] Japan .................................. 10-075385

[51] Int. Cl.$^6$ .................................................. G03G 9/107
[52] U.S. Cl. ........................................ 430/106.6; 430/108
[58] Field of Search .................................. 430/106.6, 108

[56] References Cited

U.S. PATENT DOCUMENTS

| | | | |
|---|---|---|---|
| 4,267,246 | 5/1981 | Nishibayashi et al. | 430/111 |
| 4,600,675 | 7/1986 | Iwasa et al. | 430/106.6 |
| 4,791,041 | 12/1988 | Aoki et al. | 430/108 |
| 4,847,176 | 7/1989 | Sano et al. | 430/106.6 |
| 5,110,703 | 5/1992 | Nagatsuka et al. | 430/108 |

FOREIGN PATENT DOCUMENTS

| | | |
|---|---|---|
| 0362710 | 9/1989 | European Pat. Off. . |
| 58167606 | 10/1983 | Japan . |

*Primary Examiner*—Roland Martin
*Attorney, Agent, or Firm*—McDermott, Will & Emery

[57] ABSTRACT

The present invention provides a binder carrier containing at least a magnetic particle and a binder resin, in which the binder resin comprises at least a copolymer containing an ethylenic unsaturated nitrile and preferably an optional silicone-modified acrylic resin.

25 Claims, No Drawings

BINDER CARRIER CONTAINING ETHYLENIC UNSATURATED NITRILE COPOLYMER AS BINDER RESIN

This application is based on applications No. Hei 10-075382 and Hei 10-075385 filed in Japan, the contents of which are hereby incorporated by reference.

BACKGROUND OF THE INVENTION

1. Field of the Invention

The present invention relates to a carrier for use in a two-component developer in an image-forming apparatus such as a digital copying machine or a printer, and more particularly to a binder carrier containing a magnetic particle dispersed in a binder resin.

2. Description of the Prior Art

In a copying machine or printer of electrophotographic system, a two-component developing method using a two-component developer containing a toner and a magnetic carrier is in practical use in developing an electrostatic latent image formed on an electrostatic latent image supporting member such as a photosensitive member.

As a carrier for a two-component developer, various carriers are known such as an iron particle carrier, a ferrite carrier, a resin-coated carrier containing these magnetic particles coated with a resin, a binder carrier containing magnetic fine particles dispersed in a binder resin. However, resin-coated carriers raise a problem that a smooth image cannot be obtained due to their hard ear when they are transported as a magnetic brush on a developing roller or problems such as disturbance of toner images or damage to the photosensitive member due to scraping. Also, the resin-coated carrier has a problem that its life as a developer is short due to peeling-off of the coating layer during its use.

The binder carrier can solve the above-mentioned problems, and is further attracting public attention as a carrier which can be produced easily in small particles, which has a high volume specific electric resistance, and into which electric charge from a developer-supporting member is not easily transferred.

However, conventional binder carriers raise a problem that the toner itself, a charge-controlling agent of the toner, a post-processing agent, or the like adhere to the carrier surface during their use, whereby the charging efficiency of the carriers deteriorates to provide insufficient charging with the toner, resulting in a toner flying phenomenon or an image noise such as fogging in an image formed on a sheet. This problem becomes conspicuous in a full color developing process that uses a large amount of toner.

SUMMARY OF THE INVENTION

The present invention is to provide a binder carrier which can prevent carrier deterioration due to the toner components such as a charge-controlling agent or a post-processing agent, and which has a long life capable of exhibiting stable charging properties for a long period of time with little deterioration of the charging efficiency.

The present invention provides a binder carrier comprising:
 a magnetic particle; and
 a binder resin comprising a copolymer containing an ethylenic unsaturated nitrile as a monomer component.

DETAILED DESCRIPTION OF THE PRESENT INVENTION

The present invention relates to a binder carrier comprising:
 a magnetic particle; and
 a binder resin comprising a copolymer containing an ethylenic unsaturated nitrile as a monomer component,
more particularly, to a binder carrier of claim 1, in which the ethylenic unsaturated nitrile is represented by the following formula (1):

in which $R_1$, $R_2$, and $R_3$ are independently a hydrogen atom or an alkyl group.)

By allowing the binder resin to contain an ethylenic unsaturated nitrile component, it is possible to reduce the amount of the toner component adhering to the carrier and to maintain stable charging properties over a long period of time.

The ethylenic unsaturated nitrile which is a constituent component monomer of the copolymer as a binder resin of the present invention is represented by the following formula (1).

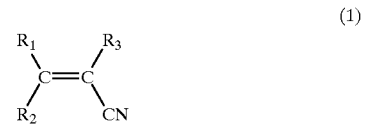

In the formula (1), $R_1$, $R_2$, and $R_3$ are independently a hydrogen atom or an alkyl group. The alkyl group may be, for example, a lower allyl group such as methyl, ethyl or propyl. Specifically, acrylonitrile, methacrylonitrile, and ethacrylonitrile are preferable, and acrylonitrile is especially preferable.

The ethylenic unsaturated nitrile is contained at a content of 40 to 90% by weight, preferably 50 to 80% by weight in the total copolymer components. If the amount of nitrile is too large, polymerization would be unstable in synthesizing the copolymer, and also the obtained resin would be hard, rendering it difficult to produce a binder carrier by a kneading-grinding method. If the amount of nitrile is too small, the polymerization would be unstable, rendering it impossible to produce the resin itself.

A radical-polymerizable organic monomer to be polymerized with the above ethylenic unsaturated nitrile is an acrylic organic monomer represented by the following general formula (2):

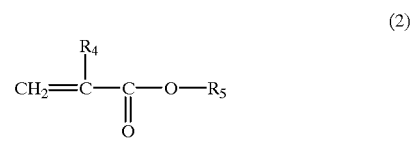

In the above formula, $R_4$ represents a hydrogen atom or an alkyl group. The alkyl group may be, for example, a C1–C4, preferably C1–C2, lower alkyl group. Among these, a hydrogen atom or a methyl group, especially a hydrogen atom, is preferable.

In the above formula, $R_5$ represents a monovalent hydrocarbon group, which may be, for example, a C1–C4, preferably C1–C2, lower alkyl group. Among these, a methyl group or an ethyl group, especially a methyl group, is preferable.

The above acrylic organic monomer is contained at a content of 60 to 10% by weight, preferably 50 to 20% by weight in the total copolymer components. If the amount of the acrylic organic monomer is too large, the relative amount of ethylenic unsaturated nitrile would decrease, thereby failing to provide the above-mentioned effects. If the amount is too small, the polymerization would be unstable, rendering it impossible to produce the resin itself In the present invention, a rubber component may be contained in the copolymer constituting the binder resin. Allowing the rubber component to be contained in the copolymer may be effective in preventing deterioration of the carrier and may achieve further improvement of the durability.

The rubber component may be, for example, butadiene, isoprene, 2,3-dimethylbutadiene, a conjugate diene-acrylonitrile rubber such as butadiene-acrylonitrile rubber, a conjugate diene-styrene rubber such as butadiene-styrene rubber, or the like. Among these, butadiene is preferable.

If the rubber component is to be contained, its amount is 0 to 50% by weight. If the rubber component is contained at more than 50% by weight, the obtained resin would be hard, rendering it difficult to produce the binder carrier.

The ethylenic unsaturated nitrile copolymer to be used in the present invention can be obtained by copolymerizing the ethylenic unsaturated nitrile of the above-mentioned general formula (1), the radical-polymerizable organic monomer of the general formula (2), and optionally the rubber component in the presence of a radical polymerization initiator such as azobisisobutyronitrile (AIBN).

The copolymerization is carried out so that the resultant copolymer has a melt index (MI) value of 1.0 to 50, preferably 1 to 40, more preferably 1.5 to 38, as measured under the condition of 150° C./2.16 kg/10 minutes. If the MI value is too small, the melting and kneading operation cannot be carried out in producing the carrier. If the MI value is too large, fusion is liable to occur in the pulverizing step in producing the carrier. If the MI value is represented by a molecular weight, it corresponds to about 30,000 to about 150,000 as a number average molecular weight (converted to styrene).

Another binder resin may be used together with the ethylenic unsaturated nitrile copolymer. Such a resin may be a known resin, for example, a polyester resin, styrene-acrylic copolymer resin, a poly(meth)acrylic resin, or an epoxy resin. The additional binder is contained at an amount that does not deteriorate the effects of the present invention, specifically, at a content of 60 wt %, preferably up to 50 wt %, more preferably up to 30 wt %, of the binder resin.

Also, it is particularly preferable to use a silicone-modified acrylic resin. The amount of silicone-modified acrylic resin to be used, if any, will be explained later.

The silicone-modified acrylic resin is obtained by copolymerizing a polydiorganosiloxane macromer having an acrylic functional group with a radical-polymerizable organic monomer.

The polydiorganosiloxane macromer having an acrylic functional group is represented by the following general formula (3):

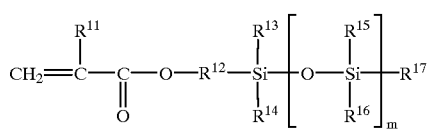
(3)

In the above formula, $R_{11}$ represents a hydrogen atom or an alkyl group. The alkyl group may be, for example, a C1–C4, preferably C1–C2, lower alkyl group. Among these, a methyl group is especially preferable.

In the above formula, $R_{12}$ represents an alkylene group, which may be, for example, a C1–C5, preferably C2–C4, lower alkylene group. Among these, a propylene group is especially preferable.

$R_{13}$ to $R_{16}$ each represent a monovalent hydrocarbon group, and may be the same or different. The monovalent hydrocarbon group may be, for example, a C1–C4, preferably C1–C2, lower alkyl group, an aryl group such as phenyl, a halogenated alkyl group such as 3,3,3-trifluoropropyl, or an alkenyl group such as vinyl or allyl. It is particularly preferable that $R_{13}$ to $R_{16}$ are the same and are each methyl.

$R_{17}$ is a group selected from the group consisting of monovalent hydrocarbon groups, a hydroxyl group, and acrylic functional groups represented by the following general formula (4):

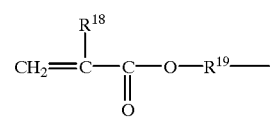
(4)

The monovalent hydrocarbon group may be, for example, a C1–C4, preferably C1–C2, lower alkyl group. Among these, a methyl group is preferable. In the above formula, $R_{18}$ represents a hydrogen atom or an alkyl group. The alkyl group may be, for example, a C1–C4, preferably C1–C2, lower alkyl group. Among these, a methyl group is preferable. $R_{19}$ represents an alkylene group, which may be, for example, a C1–C5, preferably C2–C4, lower alkylene group. Among these, a propylene group is preferable The number m is an integer from 1 to 500, preferably 25 to 300, more preferably 50 to 200.

The above-mentioned polydiorganosiloxane macromer having an acrylic functional group, if $R_{17}$ in the general formula (3) is a monovalent hydrocarbon group or a hydroxyl group, can be produced by using a lithium salt of an organosilane represented by the following general formula (5):

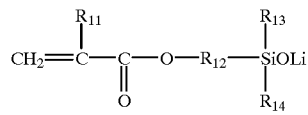
(5)

as a polymerization initiator for non-equilibrium polymerization of a cyclic trisiloxane represented by the following general formula (6):

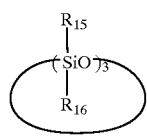
(6)

and using an acid or a triorganochlorosilane represented by the general formula (7):

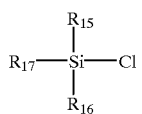
(7)

as a polymerization terminator ($R_{11}$ to $R_{17}$ in the general formulas (5) to (7) have the same meaning as defined above) (See Japanese Patent Application Laid-open No. Hei 2-92933(1990)).

On the other hand, if $R_{17}$ is represented by the above-mentioned general formula (4), the polydiorganosiloxane macromer having an acrylic functional group can be produced by condensation reaction of one mole of an organochlorosilane represented by the general formula (9):

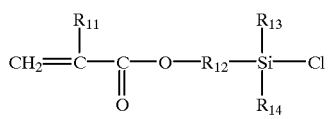
(9)

and one mole of an organochlorosilane represented by the general formula (10):

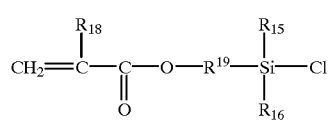
(10)

with one mole of an organopolysiloxane represented by the general formula (8):

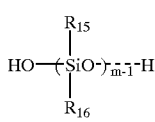
(8)

($R_{11}$ to $R_{15}$, $R_{18}$, and $R_{19}$ in the general formulas (8) to (10) have the same meaning as defined above) (See Japanese Patent Application Laid-open No. Sho 58-167606(1983)).

The radical-polymerizable organic monomer to be copolymerized with the above polydiorganosiloxane macromer having an acrylic functional group is an acrylic organic monomer similar to the one represented by the above-mentioned general formula (2).

The silicone-modified acrylic resin to be used in the present invention can be obtained by copolymerizing the above polyorganosiloxane macromer (3) having an acrylic functional group and the radical-polymerizable organic monomer (2) in the presence of a radical polymerization initiator such as azobisisobutyronitrile (AIBN).

At this step, it is preferable to allow a polyorganosiloxane represented by the following general formula (11):

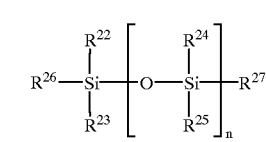
(11)

to coexist.

In the above formula, $R_{22}$ to $R_{25}$ may be the same or different, and each represent a monovalent hydrocarbon group. The monovalent hydrocarbon group may be, for example, an alkenyl group such as vinyl or allyl, an aryl group such as phenyl, a halogenated alkyl group such as 3,3,3-trifluoropropyl, or a C1–C4, preferably C1–C2, lower alkyl group. Especially, it is preferable that $R_{22}$ to $R_{25}$ are the same and are each a methyl group. $R_{26}$ and $R_{27}$ are independently a monovalent hydrocarbon group or a hydroxyl group. The monovalent hydrocarbon group may be, for example, a C1–C4, preferably C1–C2, lower alkyl group. Especially, it is preferable that $R_{26}$ and $R_{27}$ are the same and are each a methyl group.

The number n is an integer of 1 to 500, preferably 25 to 300, more preferably 50 to 200.

The polyorganosiloxane represented by the formula (11) is a known compound and can be obtained by an equilibrium polymerization reaction of a low-molecular-weight cyclic diorganopolysiloxane itself in the presence of an acid or an alkali, or by an equilibrium polymerization reaction of a low-molecular-weight cyclic diorganopolysiloxane and a low-molecular-weight linear diorganopolysiloxane in the presence of an acid or an alkali, or the like reaction. For example, polydimethylsiloxane is commercially available as SH200 oil: made by Toray Dowcorning Silicone K.K.

If the polyorganosiloxane (11) is to be contained, its amount is ⅛ to 1, preferably ¼ to ½, with respect to the polydiorganopolysiloxane macromer (3).

The silicone-modified acrylic resin is obtained as a final product by copolymerization of a polydiorganosiloxane macromer having an acrylic functional group and represented by the general formula (3) with an acrylic organic monomer represented by the general formula (2) in the presence or absence of a polydiorganosiloxane represented by the general formula (11). The ratio (Max/Msi) of the repeating unit (Mac) represented by the formula (12):

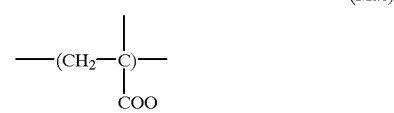
(Mac)

and the repeating unit (Msi) represented by the formula (13)

(Msi)

in the silicone-modified acrylic resin is within the range of 1/4 to 4/1, preferably 1/3 to 3/1, more preferably 1/2 to 2/1.

If the ratio Mac/Msi is smaller than 1/4, the productivity may decrease. If the ratio is larger than 4/1, the effect of preventing adhesion of the toner components such as the charge-controlling agent and the post-processing agent onto the carrier surface may not be sufficiently achieved.

The silicone-modified acrylic resin obtained as a final product is produced so as to have a softening point of 120 to 250° C. and a polymerization degree of 50 to 100 as its physical properties.

In a preferred embodiment of the present invention, the binder resin constituting the carrier comprises a mixture of the above ethylenic unsaturated nitrile copolymer, the silicone-modified resin, and optionally another binder resin at an amount that does not deteriorate the effects of the present invention.

In this preferred embodiment, the ethylenic unsaturated nitrile copolymer is allowed to be contained at a content of 5 to 95 wt %, preferably 30 to 70 wt %, of the binder resin. If the amount is too small, there would be a problem in the charging properties when it is used in combination with the negatively chargeable toner. This raises a problem such as fogging and, as a result, the durability decreases. If the amount is too large, the durability decreases and the production of the carrier would be difficult.

The silicone-modified acrylic resin is allowed to be contained at a content of 5 to 80 wt %, preferably 10 to 30 wt %, of the binder resin. If the amount is too small, the charging properties may decrease when it is used in combination with the positively chargeable toner. This raises a problem such as fogging and the durability decreases. If the amount is too large, the binding properties as a binder resin decrease in producing the carrier. This raises a problem in the dispersion properties of the components and the production of the carrier would be difficult.

The additional binder resin to be used together with the ethylenic unsaturated nitrile copolymer and the silicone-modified acrylic resin may be the one known, such as a polyester resin, a styrene-acrylic copolymer resin, a poly (meth)acrylic resin, or an epoxy resin. Among these, a poly(meth)acrylic resin is preferable because it can be suitably used either for a positively chargeable toner or for a negatively chargeable toner. In order to set the positive or negative charging amount to be higher and more stable, it is preferable to use a polyester resin, an epoxy resin, or the like if the carrier of the present invention is to be used in combination with the positively chargeable toner, and to use a styrene-acrylic copolymer resin or the like if the carrier of the present invention is to be used in combination with the negatively chargeable toner. The amount of the additional binder resin to be added is within a range that does not deteriorate the effects of the present invention, preferably up to 30 wt %, more preferably up to 10 wt %, of the binder resin.

The carrier of the present invention can be produced to have a volume average particle size of 20 to 100 μm, preferably 30 to 80 μm, by a method of heating and mixing a specified binder resin and a magnetic particle at a predetermined mixing ratio (100 to 900 parts by weight, preferably 300 to 700 parts by weight, with respect to 100 parts by weight of the binder resin) and cooling the resultant followed by pulverizing and classification, or by a method of dissolving the binder resin in a solvent and dispersing the magnetic particle in the resultant resin solution followed by spray-drying, or the like.

The carrier of the present invention preferably has a saturation magnetization of 30 to 80 emu/g, more preferably 35 to 65 emu/g, still more preferably 40 to 60 emu/g. This is because, if the saturation magnetization of the carrier is small, the magnetically binding force of the carrier on the developer-transporting member decreases. Adhesion of the carrier to the image-supporting member is liable to occur. If the saturation magnetization of the carrier is large, the carrier agglomerates partially on the developer-transporting member, rendering it impossible to form a uniform thin layer of the developer This in turn may generate a density irregularity in the images to be formed or decrease the reproducibility of half tone images and highly fine images.

As the magnetic fine particles to be used in the carrier, a metal such as iron, nickel, or cobalt, ferrite, or magnetite may be used. Especially, ferrite and magnetite are preferable. These magnetic fine particles preferably have an average primary particle size of not more than 5 μm, more preferably not more than 2 μm still more preferably 0.1 to 1 μm, in view of uniform dispersion in the binder.

The above carrier may optionally contain a dispersing agent such as carbon black, silica, titania, or alumina If such a dispersing agent is contained, the uniform dispersion of the magnetic particle in the binder resin can be improved. An amount of the dispersing agent is preferably 0.01 to 5% by weight relative to the resin.

A toner content relative to the carrier in the developer of the present invention is preferably 3 to 20% by weight, more preferably 5 to 10% by weight.

If the toner content is smaller than 3% by weight, a sufficient image density may not be obtained and the toner may be excessively charged. If the toner content is larger than 20% by weight, the toner is not sufficiently charged. Fogging is liable to occur in the image.

EXAMPLES

Binder resins used in producing the carriers are given below.

Resin A: Thermoplastic polyester resin (Tm: 120° C., Tg: 65° C.,: made by Kao K.K.)

Resin B: Thermoplastic polyester resin (Tm: 104° C., Tg: 63° C.,: made by Kao K.K.)

Resin C: Thermoplastic styrene-acrylic resin (Tm: 117° C., Tg: 67° C.,: made by Mitsubishi Kagaku K.K.)

Resin D: Thermoplastic acrylonitrile-methyl acrylate-butadiene copolymer (acrylonitrile 60%, methyl acrylate 40%, butadiene 0%, MI value: 22.1)

Resin E: Thermoplastic acrylonitrile-methyl acrylate-butadiene copolymer (acrylonitrile 60%, methyl acrylate 30%, butadiene 10%, MI value: 5)

Resin F: Thermoplastic acrylonitrile-methyl acrylate-butadiene copolymer (acrylonitrile 60%, methyl acrylate 20%, butadiene 20%, MI value: 3.3)

Resin G: Thermoplastic acrylonitrile-methyl acrylate-butadiene copolymer (acrylonitrile 60%, methyl acrylate 10%, butadiene 30%, MI value: 2.2)

Resin H: Thermoplastic acrylonitrile-methyl acrylate-butadiene copolymer (acrylonitrile 55%, methyl acrylate 5%, butadiene 40%, MI value: 1.8)

Resin I: Thermoplastic acrylonitrile-methyl acrylate-butadiene copolymer (acrylonitrile 50%, methyl acrylate 2%, butadiene 48%, MI value: 1.5)

Resin J: Thermoplastic acrylonitrile-methyl acrylate-butadiene copolymer (acrylonitrile 50%, methyl acrylate 40%, butadiene 10%, MI value: 10)

Resin K: Thermoplastic acrylonitrile-methyl acrylate-butadiene copolymer (acrylonitrile 70%, methyl acrylate 20%, butadiene 10%, MI value: 0)

Resin L: Thermoplastic acrylonitrile-methyl acrylate-butadiene copolymer (acrylonitrile 80%, methyl acrylate 10%, butadiene 10%, MI value: 0)

Resin M: Thermoplastic acrylonitrile-methyl acrylate-butadiene copolymer (acrylonitrile 60%, methyl acrylate 35%, butadiene 5%, MI value: 7.6)

Resin N: Thermoplastic acrylonitrile-methyl acrylate-butadiene copolymer (acrylonitrile 70%, methyl acrylate 25%, butadiene 5%, MI value: 2)

Resin O: Thermoplastic acrylonitrile-methyl acrylate-butadiene copolymer (acrylonitrile 80%, methyl acrylate 15%, butadiene 5%, MI value: 1.6)

Resin P: Thermoplastic acrylonitrile-methyl acrylate-butadiene copolymer (acrylonitrile 65%, methyl acrylate 25%, butadiene 10%, MI value: 1.3)

Resin Q: Thermoplastic acrylonitrile-methyl acrylate-butadiene copolymer (acrylonitrile 50%, methyl acrylate 50%, butadiene 0%, MI value: 37.8)

Resin R: Thermoplastic acrylonitrile-methyl acrylate-butadiene copolymer (acrylonitrile 56%, methyl acrylate 40%, butadiene 4%, MI value: 9.2) (the resin R is a mixed system of resin A and resin N at 20/80 (resin A/resin N).)

Example of Producing Carrier A1

| | |
|---|---|
| Resin A | 100 parts by weight |
| Ferrite magnetic particle | 500 parts by weight |
| (MFP-2: made by TDK K.K.) | |
| Carbon black | 2 parts by weight |
| (EC: made by Lion Yushi K.K.) | |
| Silica | 1.5 parts by weight |
| (#200: made by Nippon Aerosil K.K.) | |

The above-mentioned materials were sufficiently mixed by means of a Henschel mixer and then melted and kneaded at 200° C. by means of a vented twin-screw extrusion kneader (PCM-65: made by Ikegai Tekko K.K.). This kneaded product was coarsely pulverized by means of a feather mill and then finely pulverized by means of a mechanical pulverizer (ACM-10 type: made by Hosokawa Micron K.K.) and was classified by means of an air-classifier (MS-1 type: made by Hosokawa Micron K.K.). The classified product was subjected to a heat treatment at 350° C. by means of a Surfusing System (SFS-2 type: made by Nippon Pneumatic Kogyo K.K.) to give a carrier having a volume average particle size of 60 μm. The obtained carrier is referred to as "Carrier A1".

Example of Producing Carrier B1

| | |
|---|---|
| Resin B | 100 parts by weight |
| Magnetite magnetic particle | 500 parts by weight |
| (EPT-1000: made by Toda Kogyo K.K.) | |
| Carbon black | 2 parts by weight |
| (#970: made by Mitsubishi Kagaku K.K.) | |
| Silica | 1.5 parts by weight |
| (H3004F: made by Wacker K.K.) | |

A carrier having a volume average particle size of 60 μm was obtained in the same manner as the method for producing the carrier A1 by using the above materials. The obtained carrier is referred to as "Carrier B1".

Example of Producing Carrier C1

| | |
|---|---|
| Resin C | 100 parts by weight |
| Magnetite magnetic particle | 500 parts by weight |
| (RB-BL: made by Titan Kogyo K.K.) | |
| Carbon black | 2 parts by weight |
| (REGAL330: made by Cabot K.K.) | |
| Silica | 1.5 parts by weight |
| (H2000: made by Wacker K.K.) | |

A carrier having a volume average particle size of 60 μm was obtained in the same manner as the method for producing the carrier A1 by using the above materials. The obtained carrier is referred to as "Carrier C1".

Example of Producing Carrier D1

| | |
|---|---|
| Resin D | 100 parts by weight |
| Ferrite magnetic particle | 500 parts by weight |
| (MFP-2: made by TDK K.K.) | |
| Carbon black | 2 parts by weight |
| (#970: made by Mitsubishi Kagaku K.K.) | |
| Silica | 1.5 parts by weight |
| (H3004F: made by Wacker K.K.) | |

A carrier having a volume average particle size of 60 μm was obtained in the same manner as the method for producing the carrier A1 by using the above materials. The obtained carrier is referred to as "Carrier D1".

Example of Producing Carrier E1

| | |
|---|---|
| Resin E | 100 parts by weight |
| Magnetite magnetic particle | 500 parts by weight |
| (RB-BL: made by Titan Kogyo K.K.) | |
| Carbon black | 2 parts by weight |
| (EC: made by Lion Yushi K.K.) | |
| Silica | 1.5 parts by weight |
| (HF3004F: made by Wacker K.K.) | |

A carrier having a volume average particle size of 60 μm was obtained in the same manner as the method for producing the carrier A1 by using the above materials. The obtained carrier is referred to as "Carrier E1".

Example of Producing Carrier F1

| | |
|---|---|
| Resin F | 100 parts by weight |
| Magnetite magnetic particle | 500 parts by weight |
| (EPT-1000: made by Toda Kogyo K.K.) | |
| Carbon black | 2 parts by weight |
| (REGAL330: made by Cabot K.K.) | |
| Silica | 1.5 parts by weight |
| (#200: made by Nippon Aerosil K.K.) | |

A carrier having a volume average particle size of 60 μm was obtained in the same manner as the method for producing the carrier A1 by using the above materials. The obtained carrier is referred to as "Carrier F1".

Example of Producing Carrier G1

| | |
|---|---|
| Resin G | 100 parts by weight |
| Ferrite magnetic particle | 400 parts by weight |
| (MFP-2: made by TDK K.K.) | |
| Carbon black | 2 parts by weight |
| (EC: made by Lion Yushi K.K.) | |
| Silica | 1.5 parts by weight |
| (R976: made by Nippon Aerosil K.K.) | |

A carrier having a volume average particle size of 60 μm was obtained in the same manner as the method for producing the carrier A1 by using the above materials. The obtained carrier is referred to as "Carrier G1".

Example of Producing Carrier H1

| Resin H | 100 parts by weight |
|---|---|
| Magnetite magnetic particle | 500 parts by weight |
| (RB-BL: made by Titan Kogyo K.K.) | |
| Carbon black | 2 parts by weight |
| (EC-DJ600: made by Lion Yushi K.K.) | |
| Silica | 1.5 parts by weight |
| (#200: made by Nippon Aerosil K.K.) | |

A carrier having a volume average particle size of 60 μm was obtained in the same manner as the method for producing the carrier A1 by using the above materials. The obtained carrier is referred to as "Carrier H1".

Example of Producing Carrier I1

| Resin I | 100 parts by weight |
|---|---|
| Ferrite magnetic particle | 500 parts by weight |
| (MFP-2: made by TDK K.K.) | |
| Carbon black | 2 parts by weight |
| (EC-DJ500: made by Lion Yushi K.K.) | |
| Silica | 1.5 parts by weight |
| (R976: made by Nippon Aerosil K.K.) | |

A carrier having a volume average particle size of 60 μm was obtained in the same manner as the method for producing the carrier A1 by using the above materials. The obtained carrier is referred to as "Carrier I1".

Example of Producing Carrier J1

| Resin J | 100 parts by weight |
|---|---|
| Magnetite magnetic particle | 500 parts by weight |
| (RB-BL: made by Titan Kogyo K.K.) | |
| Carbon black | 2 parts by weight |
| (#970: made by Mitsubishi Kagaku K.K.) | |
| Silica | 1.5 parts by weight |
| (H3004F: made by Wacker K.K.) | |

A carrier having a volume average particle size of 60 μm was obtained in the same manner as the method for producing the carrier A1 by using the above materials. The obtained carrier is referred to as "Carrier J1".

Example of Producing Carrier K1

| Resin K | 100 parts by weight |
|---|---|
| Magnetite magnetic particle | 500 parts by weight |
| (EPT-1000: made by Toda Kogyo K.K.) | |
| Carbon black | 2 parts by weight |
| (REGAL330: made by Cabot K.K.) | |
| Silica | 1.5 parts by weight |
| (H2000: made by Wacker K.K.) | |

An attempt was made to produce a carrier in the same manner as the method for producing the carrier A1 by using the above materials. However, a usable carrier was not obtained.

Example of Producing Carrier L1

| Resin L | 100 parts by weight |
|---|---|
| Ferrite magnetic particle | 500 parts by weight |
| (MFP-2: made by TDK K.K.) | |
| Carbon black | 2 parts by weight |
| (EC: made by Lion Yushi K.K.) | |
| Silica | 1.5 parts by weight |
| (#200: made by Nippon Aerosil K.K.) | |

An attempt was made to produce a carrier in the same manner as the method for producing the carrier A1 by using the above materials. However, a usable carrier was not obtained.

Example of Producing Carrier M1

| Resin M | 100 parts by weight |
|---|---|
| Ferrite magnetic particle | 500 parts by weight |
| (MFP-2: made by TDK K.K.) | |
| Carbon black | 2 parts by weight |
| (#970: made by Mitsubishi Kagaku K.K.) | |
| Silica | 1.5 parts by weight |
| (H2000: made by Wacker K.K.) | |

A carrier having a volume average particle size of 60 μm was obtained in the same manner as the method for producing the carrier A1 by using the above materials. The obtained carrier is referred to as "Carrier M1".

Example of Producing Carrier N1

| Resin N | 100 parts by weight |
|---|---|
| Ferrite magnetic particle | 500 parts by weight |
| (MFP-2; made by TDK K.K.) | |
| Carbon black | 2 parts by weight |
| (#970: made by Mitsubishi Kagaku K.K.) | |
| Silica | 1.5 parts by weight |
| (H3004F: made by Wacker K.K.) | |

A carrier having a volume average particle size of 60 μm was obtained in the same manner as the method for producing the carrier A1 by using the above materials. The obtained carrier is referred to as "Carrier N1".

Example of Producing Carrier O1

| Resin O | 100 parts by weight |
|---|---|
| Magnetite magnetic particle | 500 parts by weight |
| (RB-BL: made by Titan Kogyo K.K.) | |
| Carbon black | 2 parts by weight |
| (REGAL330: made by Cabot K.K.) | |
| Silica | 1.5 parts by weight |
| (#200: made by Lion Yushi K.K.) | |

A carrier having a volume average particle size of 60 μm was obtained in the same manner as the method for producing the carrier A1 by using the above materials. The obtained carrier is referred to as "Carrier O1".

Example of Producing Carrier P1

| Resin P | 100 parts by weight |
|---|---|
| Magnetite magnetic particle (RB-BL: made by Titan Kogyo K.K.) | 500 parts by weight |
| Carbon black (EC: made by Lion Yushi K.K.) | 2 parts by weight |
| Silica (#200: made by Nippon Aerosil K.K.) | 1.5 parts by weight |

An attempt was made to produce a carrier in the same manner as the method for producing the carrier A1 by using the above materials. However, a usable carrier was not obtained.

Example of Producing Carrier Q1

| Resin Q | 100 parts by weight |
|---|---|
| Magnetite magnetic particle (EPT-1000: made by Toda Kogyo K.K.) | 500 parts by weight |
| Carbon black (REGAL330: made by Cabot K.K.) | 2 parts by weight |
| Silica (H2000: made by Wacker K.K.) | 1.5 parts by weight |

A carrier having a volume average particle size of 60 µm was obtained in the same manner as the method for producing the carrier A1 by using the above materials. The obtained carrier is referred to as "Carrier Q1".

Example of Producing Carrier R1

| Resin R | 100 parts by weight |
|---|---|
| Magnetite magnetic particle (RB-BL: made by Titan Kogyo K.K.) | 500 parts by weight |
| Carbon black (EC: made by Lion Yushi K.K.) | 2 parts by weight |
| Silica (#200: made by Nippon Aerosil K.K.) | 1.5 parts by weight |

A carrier having a volume average particle size of 60 µm was obtained in the same manner as the method for producing the carrier A1 by using the above materials. The obtained carrier is referred to as "Carrier R1".

Production of Toner a1

| Thermoplastic polyester resin (softening point 120° C., glass transition point 61° C.) | 100 parts by weight |
|---|---|
| Carbon black (Mogul L: made by Cabot K.K.) | 8 parts by weight |
| Low molecular weight propylene (Viscol 550P: made by Sanyo Kasei Kogyo K.K.) | 3 parts by weight |
| Negative charge-controlling agent (Bontron S-34: made by Orient Kagaku Kogyo K.K.) | 5 parts by weight |

The above ingredients were sufficiently mixed and then melted and kneaded at 140° C. by means of a vented twin-screw kneader, followed by cooling the kneaded product. After cooling, the kneaded product was coarsely pulverized by means of a feather mill, then further finely pulverized by means of a jet pulverizer, and then subjected to air-classification to give black fine particles having a volume average particle size of 9 µm. To 100 parts by weight of this black fine particle was added 0.3 part by weight of hydrophobic silica (H-2000: made by Hoechst Japan K.K.), and the mixture was treated at 1000 rpm for one minute by means of a Henschel mixer (made by Mitsui Miike Kakoki K.K.) to give a negatively chargeable toner. The obtained toner is referred to as "Toner a1".

Production of Toner b1

A polyester resin (softening point: 100° C., glass transition point: 58° C.) and a magenta pigment (C.I. Pigment Red 184) were introduced into a pressure kneader so that the ratio would be resin:pigment=7:3 by weight, and the mixture was kneaded. The kneaded product was cooled and then pulverized by means of a feather mill to give a pigment master batch.

The above polyester resin (93 parts by weight), the above master batch (10 parts by weight), and zinc salicylate complex (E-84: made by Orient Kagaku Kogyo K.K.) (2 parts by weight) were processed in the same manner as the method for producing the Toner a1, to give fine particles having a volume average particle size of 8.5 µm. To 100 parts by weight of this black fine particle were added 0.5 part by weight of hydrophobic silica (H-2000: made by Hoechst Japan K.K.) and 0.6 part by weight of titanium oxide fine particles (STT-30A: made by Titan Kogyo K.K.), and the mixture was treated at 1000 rpm for one minute by means of a Henschel mixer to give a magenta toner. The obtained toner is referred to as "Toner b1".

Example I-1 to Example I-12 and Comparative Examples I-1 to 1-3

Developers for use in the Examples and the Comparative Examples were prepared by using the Carriers A1 to Q1 and the Toner a1 obtained in the above process and combining them as shown in the following Table I-1 with the ratio (T/C) of the toner (T) to the carrier (C) being 6% by weight.

TABLE I-1

|  | Carrier | Toner | T/C(%) |
|---|---|---|---|
| Example I-1 | E1 | a1 | 6 |
| Example I-2 | F1 | a1 | 6 |
| Example I-3 | G1 | a1 | 6 |
| Example I-4 | H1 | a1 | 6 |
| Example I-5 | I1 | a1 | 6 |
| Example I-6 | J1 | a1 | 6 |
| Example I-7 | M1 | a1 | 6 |
| Example I-8 | N1 | a1 | 6 |
| Example I-9 | O1 | a1 | 6 |
| Example I-10 | R1 | a1 | 6 |
| Example I-11 | D1 | a1 | 6 |
| Example I-12 | Q1 | a1 | 6 |
| Comparative Example I-1 | A1 | a1 | 6 |
| Comparative Example I-2 | B1 | a1 | 6 |
| Comparative Example I-3 | C1 | a1 | 6 |

Evaluation I-1

The developers obtained in Examples I-1 to I-12 and Comparative Examples I-1 to I-3 were each mixed for one hour by means of a roll mill. These developers were put into a copying machine Di-30: made by Minolta K.K. to copy images with a B/W ratio of 15% on 150,000 sheets under an N/N environment (25° C., 50%) for visual evaluation of fogging on a white pulverized at an initial stage and at stages of 20,000 sheets (20K), 50,000 sheets (50K), 100,000 sheets (100K), 130,000 sheets (130K), and 150,000 sheets (150K). Also, 150,000 sheets were printed with images of a B/W ratio of 15% under an H/L environment (30° C., 80%) and under an L/L environment (10° C., 10%) for visual evaluation of fogging on a white pulverized at an initial stage and at stages of 50,000 sheets (50K), 100,000 sheets (100K), and 150,000 sheets (150K) in the same manner.

Evaluation results were ranked as follows:
⊚: Rank 5 No fogging at all
○: Ranks 3 to 4 Fogging is not observed visually, but can be confirmed by a microscope or the like.
Δ: Rank 2 A little fogging is confirmed visually.
×: Rank 1 Much fogging is observed over the entire image.

The results are shown in the following Table I-2.

Evaluation I-2

The developers obtained in Examples I-13 to I-23 and Comparative Examples I-4 to I-7 were each mixed for one hour by means of a roll mill. These developers were put into a copying machine CF-70: made by Minolta K.K. to copy images with a B/W ratio of 15% on 100,000 sheets under an N/N environment (25° C., 50%) for visual evaluation of fogging on a white pulverized at an initial stage and at stages of 10,000 sheets (10K), 20,000 sheets (20K), 30,000 sheets (30K), 50,000 sheets (50K), 70,000 sheets (70K), and 100,

TABLE I-2

Fogging (shown for N/N, H/H, and L/L environments, respectively)

|  | Initial stage (0K) | 20K | 50K | 100K | 130K | 150K |
|---|---|---|---|---|---|---|
| Example I-1 | ⊚ ⊚ ⊚ | ⊚ | ⊚ ⊚ ⊚ | ⊚ ⊚ ⊚ | ⊚ | ⊚ ⊚ ⊚ |
| Example I-2 | ⊚ ⊚ ⊚ | ⊚ | ⊚ ⊚ ⊚ | ⊚ ⊚ ⊚ | ⊚ | ⊚ ⊚ ⊚ |
| Example I-3 | ⊚ ⊚ ⊚ | ⊚ | ⊚ ⊚ ⊚ | ⊚ ⊚ ⊚ | ⊚ | ⊚ ⊚ ⊚ |
| Example I-4 | ⊚ ⊚ ⊚ | ⊚ | ⊚ ⊚ ⊚ | ⊚ ⊚ ⊚ | ⊚ | ⊚ ⊚ ⊚ |
| Example I-5 | ⊚ ⊚ ⊚ | ⊚ | ⊚ ⊚ ⊚ | ⊚ ⊚ ⊚ | ⊚ | ⊚ ⊚ ⊚ |
| Example I-6 | ⊚ ⊚ ⊚ | ⊚ | ⊚ ⊚ ⊚ | ⊚ ⊚ ⊚ | ⊚ | ⊚ ⊚ ⊚ |
| Example I-7 | ⊚ ⊚ ⊚ | ⊚ | ⊚ ⊚ ⊚ | ⊚ ⊚ ⊚ | ⊚ | ⊚ ⊚ ⊚ |
| Example I-8 | ⊚ ⊚ ⊚ | ⊚ | ⊚ ⊚ ⊚ | ⊚ ⊚ ⊚ | ⊚ | ⊚ ⊚ ⊚ |
| Example I-9 | ⊚ ⊚ ⊚ | ⊚ | ⊚ ⊚ ⊚ | ⊚ ⊚ ⊚ | ⊚ | ⊚ ⊚ ⊚ |
| Example I-10 | ⊚ ⊚ ⊚ | ⊚ | ⊚ ⊚ ⊚ | ⊚ ⊚ ⊚ | ⊚ | ⊚ ⊚ ⊚ |
| Example I-11 | ○ ○ ○ | ○ | Δ x x | Δ x x | x | x x x |
| Example I-12 | ○ ○ ○ | Δ | Δ Δ Δ | x x x | x | x x x |
| Comparative Example I-1 | ○ ○ ○ | ○ | x x x | x x x | x | x x x |
| Comparative Example I-2 | ○ ○ ○ | ○ | x x x | x x x | x | x x x |
| Comparative Example I-3 | ○ ○ ○ | ○ | x x x | x x x | x | x x x |

Example I-13 to Example I-23 and Comparative Examples I-4 to I-7

Developers for use in the Examples and the Comparative Examples were prepared by using the Carriers A1 to Q1 and the Toner b1 obtained in the above process and combining them as shown in the following Table I-3 with the ratio (T/C) of the toner (T) to the carrier (C) being 6% by weight.

TABLE I-3

|  | Carrier | Toner | T/C(%) |
|---|---|---|---|
| Example I-13 | E1 | b1 | 6 |
| Example I-14 | F1 | b1 | 6 |
| Example I-15 | G1 | b1 | 6 |
| Example I-16 | H1 | b1 | 6 |
| Example I-17 | I1 | b1 | 6 |
| Example I-18 | J1 | b1 | 6 |
| Example I-19 | M1 | b1 | 6 |
| Example I-20 | N1 | b1 | 6 |
| Example I-21 | O1 | b1 | 6 |
| Example I-22 | R1 | b1 | 6 |
| Example I-23 | D1 | b1 | 6 |
| Comparative Example I-4 | A1 | b1 | 6 |
| Comparative Example I-5 | B1 | b1 | 6 |
| Comparative Example I-6 | C1 | b1 | 6 |
| Comparative Example I-7 | D1 | b1 | 6 |

000 sheets (100K). Also, 100,000 sheets were printed with images of a B/W ratio of 15% under an H/L environment (30° C., 80%) and under an L/L environment (10° C., 10%) for visual evaluation of fogging on a white pulverized at an initial stage and at stages of 50,000 sheets (50K) and 100,000 sheets (100K) sheets in the same manner. Evaluation results were ranked as the following.

Fogging
⊚: Rank 5 No fogging at all
○: Ranks 3 to 4 Fogging is not observed visually, but can be confirmed by a microscope or the like.
Δ: Rank 2 A little fogging is confirmed visually.
×: Rank 1 Much fogging is observed over the entire image.

Also, under the N/N environment (25° C., 50%), evaluations were made for toner flying in addition to fogging. The toner flying was ranked as follows by measuring an amount of toner received by a toner collecting portion in the copying machine.

Toner flying
⊚: Amount of toner being not more than 5 mg/k
○: Amount of toner being more than 5 mg/k and not more than 10 mg/k
Δ: Amount of toner being more than 10 mg/k and not more than 20 mg/k
×: Amount of toner being more than 20 mg/k (in the above "k" representing 1000)

The results are shown in the following Tables I-4 and I-5.

TABLE I-4

Fogging (shown for N/N, H/H, and L/L environments, respectively)

|  | Initial stage (0K) | 10K | 20K | 30K | 40K | 50K | 70K | 100K |
|---|---|---|---|---|---|---|---|---|
| Example I-13 | ⊚ ⊚ ⊚ | ⊚ | ⊚ | ⊚ | ⊚ | ⊚ ⊚ ⊚ | ⊚ | ⊚ ○ ○ |
| Example I-14 | ⊚ ⊚ ⊚ | ⊚ | ⊚ | ⊚ | ⊚ | ⊚ ⊚ ⊚ | ⊚ | ⊚ ○ ○ |
| Example I-15 | ⊚ ⊚ ⊚ | ⊚ | ⊚ | ⊚ | ⊚ | ⊚ ⊚ ⊚ | ⊚ | ⊚ ○ ○ |

TABLE I-4-continued

| | Fogging (shown for N/N, H/H, and L/L environments, respectively) | | | | | | | |
|---|---|---|---|---|---|---|---|---|
| | Initial stage (0K) | 10K | 20K | 30K | 40K | 50K | 70K | 100K |
| Example I-16 | ⊚ ⊚ ⊚ | ⊚ | ⊚ | ⊚ | ⊚ | ⊚ ⊚ ⊚ | ⊚ | ⊚ ○ ○ |
| Example I-17 | ⊚ ⊚ ⊚ | ⊚ | ⊚ | ⊚ | ⊚ | ⊚ ⊚ ⊚ | ⊚ | ⊚ ○ ○ |
| Example I-18 | ⊚ ⊚ ⊚ | ⊚ | ⊚ | ⊚ | ⊚ | ⊚ ⊚ ⊚ | ⊚ | ⊚ ○ ○ |
| Example I-19 | ⊚ ⊚ ⊚ | ⊚ | ⊚ | ⊚ | ⊚ | ⊚ ⊚ ⊚ | ○ | Δ Δ Δ |
| Example I-20 | ⊚ ⊚ ⊚ | ⊚ | ⊚ | ⊚ | ⊚ | ⊚ ⊚ ⊚ | ○ | Δ Δ Δ |
| Example I-21 | ⊚ ⊚ ⊚ | ⊚ | ⊚ | ⊚ | ⊚ | ⊚ ⊚ ⊚ | ○ | Δ Δ Δ |
| Example I-22 | ⊚ ⊚ ⊚ | ⊚ | ⊚ | ⊚ | ⊚ | ⊚ ⊚ ⊚ | ○ | Δ Δ Δ |
| Example I-23 | ○ ○ ○ | ○ | ○ | Δ | × | × × × | × | × × × |
| Comparative Example I-4 | ○ ○ ○ | ○ | × | × | × | × × × | × | × × × |
| Comparative Example I-5 | ○ ○ ○ | ○ | × | × | × | × × × | × | × × × |
| Comparative Example I-6 | ○ ○ ○ | ○ | × | × | × | × × × | × | × × × |
| Comparative Example I-7 | ○ ○ ○ | ○ | Δ | × | × | × × × | × | × × × |

TABLE I-5

| | Amount of toner flying | | | | | | | |
|---|---|---|---|---|---|---|---|---|
| | Initial stage (0K) | 10K | 20K | 30K | 40K | 50K | 70K | 100K |
| Example I-13 | ⊚ | ⊚ | ⊚ | ⊚ | ⊚ | ⊚ | ⊚ | ⊚ |
| Example I-14 | ⊚ | ⊚ | ⊚ | ⊚ | ⊚ | ⊚ | ⊚ | ⊚ |
| Example I-15 | ⊚ | ⊚ | ⊚ | ⊚ | ⊚ | ⊚ | ⊚ | ⊚ |
| Example I-16 | ⊚ | ⊚ | ⊚ | ⊚ | ⊚ | ⊚ | ⊚ | ⊚ |
| Example I-17 | ⊚ | ⊚ | ⊚ | ⊚ | ⊚ | ⊚ | ⊚ | ⊚ |
| Example I-18 | ⊚ | ⊚ | ⊚ | ⊚ | ⊚ | ⊚ | ⊚ | ⊚ |
| Example I-19 | ⊚ | ⊚ | ⊚ | ⊚ | ⊚ | ⊚ | ○ | ○ |
| Example I-20 | ⊚ | ⊚ | ⊚ | ⊚ | ⊚ | ⊚ | ○ | ○ |
| Example I-21 | ⊚ | ⊚ | ⊚ | ⊚ | ⊚ | ⊚ | ○ | ○ |
| Example I-22 | ⊚ | ⊚ | ⊚ | ⊚ | ⊚ | ⊚ | ○ | ○ |
| Example I-23 | ⊚ | ○ | ○ | Δ | × | × | × | × |
| Comparative Example I-4 | ○ | ○ | × | × | × | × | × | × |
| Comparative Example I-5 | ○ | ○ | × | × | × | × | × | × |
| Comparative Example I-6 | ○ | ○ | × | × | × | × | × | × |
| Comparative Example I-7 | ○ | ○ | Δ | × | × | × | × | × |

EXAMPLE II

The resins constituting the binder resins used for production of the carriers are given below.

Ethylenic unsaturated nitrile copolymer: Thermoplastic acrylonitrile-methyl acrylate-butadiene copolymer (acrylonitrile 65%, methyl acrylate 15%, butadiene 20%, MI value: 5.0) (hereafter simply referred to as "acrylonitrile copolymer").

Silicone-modified acrylic resin: (softening point 200° C.,: made by DCTS K.K.).

Thermoplastic polyester resin (Tm: 121° C., Tg: 67° C.,: made by KAO K.K.).

Here, the above silicone-modified acrylic resin is synthesized by allowing polydimethylsiloxane of the formula (3) wherein ① and ② is as follows:

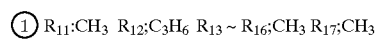
① $R_{11}$:$CH_3$  $R_{12}$;$C_3H_6$  $R_{13} \sim R_{16}$;$CH_3$  $R_{17}$;$CH_3$

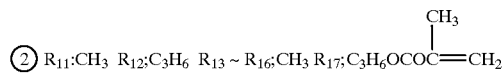
② $R_{11}$:$CH_3$  $R_{12}$;$C_3H_6$  $R_{13} \sim R_{16}$;$CH_3$  $R_{17}$;$C_3H_6OCOC(CH_3)=CH_2$ to react with a polydimethylsiloxane of the formula (11) wherein ③ $R_{22}$ to $R_{27}$ are each $CH_3$. The ratio Mac/Msi in the resins is (1/1).

Example of Producing Carrier A2

| | |
|---|---|
| Acrylonitrile copolymer | 90 parts by weight |
| Silicone-modified acrylic resin | 10 parts by weight |
| Ferrite magnetic particle (MFP-2: made by TDK K.K.) | 500 parts by weight |
| Carbon black (EC: made by Lion Yushi K.K.) | 2 parts by weight |
| Silica (H2000: made by Wacker K.K.) | 1.5 parts by weight |

The above ingredients were sufficiently mixed by means of a Henschel mixer and then melted and kneaded at 200° C. by means of a vented twin-screw extrusion kneader (PCM-65: made by Ikegai Tekko K.K.). This kneaded product was coarsely pulverized by means of a feather mill and then finely pulverized by means of a mechanical pulverizer (ACM-10 type: made by Hosokawa Micron K.K.) and was classified by means of an air-classifier (MS-1 type: made by Hosokawa Micron K.K.). The classified product was subjected to a heat treatment at 350° C. by means of a Surfusing System (SFS-2 type: made by Nippon Pneumatic Kogyo K.K.) to give a carrier having a volume average particle size of 60 μm. The obtained carrier is referred to as "Carrier A2".

Example of Producing Carrier B2

| | |
|---|---|
| Acrylonitrile copolymer | 70 parts by weight |
| Silicone-modified acrylic resin | 30 parts by weight |
| Magnetite magnetic particle | 500 parts by weight |
| (RB-BL: made by Titan Kogyo K.K.) | |
| Carbon black | 2 parts by weight |
| (REGAL330: made by Cabot K.K.) | |
| Silica | 1.5 parts by weight |
| (#200: made by Nippon Aerosil K.K.) | |

A carrier having a volume average particle size of 60 μm was obtained in the same manner as the method for producing the carrier A2 by using the above materials. The obtained carrier is referred to as "Carrier B2".

Example of Producing Carrier C2

| | |
|---|---|
| Acrylonitrile copolymer | 50 parts by weight |
| Silicone-modified acrylic resin | 50 parts by weight |
| Ferrite magnetic particle | 500 parts by weight |
| (MFP-2: made by TDK K.K.) | |
| Carbon black | 2 parts by weight |
| (REGAL330: made by Cabot K.K.) | |
| Silica | 1.5 parts by weight |
| (H2000: made by Wacker K.K.) | |

A carrier having a volume average particle size of 60 μm was obtained in the same manner as the method for producing the carrier A2 by using the above materials. The obtained carrier is referred to as "Carrier C2".

Example of Producing Carrier D2

| | |
|---|---|
| Acrylonitrile copolymer | 30 parts by weight |
| Silicone-modified acrylic resin | 70 parts by weight |
| Magnetite magnetic particle | 500 parts by weight |
| (RB-BL: made by Titan Kogyo K.K.) | |
| Carbon black | 2 parts by weight |
| (EC: made by Lion Yushi K.K.) | |
| Silica | 1.5 parts by weight |
| (#200: made by Nippon Aerosil K.K.) | |

A carrier having a volume average particle size of 60 μm was obtained in the same manner as the method for producing the carrier A2 by using the above materials. The obtained carrier is referred to as "Carrier D2".

Example of Producing Carrier E2

| | |
|---|---|
| Acrylonitrile copolymer | 100 parts by weight |
| Silicone-modified acrylic resin | 0 part by weight |
| Magnetite magnetic particle | 500 parts by weight |
| (RB-BL: made by Titan Kogyo K.K.) | |
| Carbon black | 2 parts by weight |
| (REGAL330: made by Cabot K.K.) | |
| Silica | 1.5 parts by weight |
| (#200: made by Nippon Aerosil K.K.) | |

A carrier having a volume average particle size of 60 μm was obtained in the same manner as the method for producing the carrier A2 by using the above materials. The obtained carrier is referred to as "Carrier E2".

Example of Producing Carrier F2

| | |
|---|---|
| Acrylonitrile copolymer | 95 parts by weight |
| Silicone-modified acrylic resin | 5 parts by weight |
| Ferrite magnetic particle | 500 parts by weight |
| (MFP-2: made by TDK K.K.) | |
| Carbon black | 2 parts by weight |
| (EC: made by Lion Yushi K.K.) | |
| Silica | 1.5 parts by weight |
| (H2000: made by Wacker K.K.) | |

A carrier having a volume average particle size of 60 μm was obtained in the same manner as the method for producing the carrier A2 by using the above materials. The obtained carrier is referred to as "Carrier F2".

Example of Producing Carrier G2

| | |
|---|---|
| Acrylonitrile copolymer | 40 parts by weight |
| Silicone-modified acrylic resin | 30 parts by weight |
| Polyester resin | 30 parts by weight |
| Ferrite magnetic particle | 500 parts by weight |
| (MFP-2: made by TDK K.K.) | |
| Carbon black | 2 parts by weight |
| (REGAL330: made by Cabot K.K.) | |
| Silica | 1.5 parts by weight |
| (H2000: made by Wacker K.K.) | |

A carrier having a volume average particle size of 60 μm was obtained in the same manner as the method for producing the carrier A2 by using the above materials. The obtained carrier is referred to as "Carrier G2".

Example of Producing Carrier H2

| | |
|---|---|
| Polyester resin | 100 parts by weight |
| Ferrite magnetic particle | 500 parts by weight |
| (MFP-2: made by TDK K.K.) | |
| Carbon black | 2 parts by weight |
| (REGAL330: made by Cabot K.K.) | |
| Silica | 1.5 parts by weight |
| (H2000: made by Wacker K.K.) | |

A carrier having a volume average particle size of 60 μm was obtained in the same manner as the method for producing the carrier A2 by using the above materials. The obtained carrier is referred to as "Carrier H2".

Example of Producing Carrier I2

| | |
|---|---|
| Acrylonitrile copolymer | 0 part by weight |
| Silicone-modified acrylic resin | 100 parts by weight |
| Ferrite magnetic particle | 500 parts by weight |
| (MFP-2: made by TDK K.K.) | |
| Carbon black | 2 parts by weight |
| (EC: made by Lion Yushi K.K.) | |
| Silica | 1.5 parts by weight |
| (H2000: made by Wacker K.K.) | |

An attempt was made to produce a carrier in the same manner as the method for producing the carrier A2 by using the above materials. However, a usable carrier was not obtained.

Example of Producing Carrier J2

| | |
|---|---|
| Acrylonitrile copolymer | 10 parts by weight |
| Silicone-modified acrylic resin | 90 parts by weight |
| Magnetite magnetic particle (RB-BL: made by Titan Kogyo K.K.) | 500 parts by weight |
| Carbon black (REGAL330: made by Cabot K.K.) | 2 parts by weight |
| Silica (#200: made by Nippon Aerosil K.K.) | 1.5 parts by weight |

An attempt was made to produce a carrier in the same manner as the method for producing the carrier A2 by using the above materials. However, a usable carrier was not obtained.

| Production of Toner a2 | |
|---|---|
| Thermoplastic polyester resin (softening point 120° C., glass transition point 61° C.) | 100 parts by weight |
| Carbon black (Mogul L: made by Cabot K.K.) | 8 parts by weight |
| Low molecular weight propylene (Viscol 550P: made by Sanyo Kasei Kogyo K.K.) | 3 parts by weight |
| Negative charge-controlling agent (Bontron S-34: made by Orient Kagaku Kogyo K.K.) | 5 parts by weight |

The above components were sufficiently mixed and then melted and kneaded at 140° C. by means of a vented twin-screw kneader, followed by cooling the kneaded product. After cooling, the kneaded product was coarsely pulverized by means of a feather mill, then further finely pulverized by means of a jet pulverizer, and then subjected to air classification to give black fine particlew having a volume average particle size of 9 µm. To 100 parts by weight of this black fine particlew was added 0.3 part by weight of hydrophobic silica (H-2000: made by Hoechst Japan K.K.), and the mixture was treated at 1000 rpm for one minute by means of a Henschel mixer (made by Mitsui Miike Kakoki K.K.) to give a negatively chargeable toner. The obtained toner is referred to as "Toner a2".

| Production of Toner b2 | |
|---|---|
| Styrene-n-butyl methacrylate resin (softening point 132° C., glass transition point 60° C.) | 100 parts by weight |
| Carbon black (MA#8: made by Mitsubishi Kasei K.K.) | 5 parts by weight |
| Low molecular weight propylene (Viscol 550P: made by Sanyo Kasei Kogyo K.K.) | 3 parts by weight |
| Negrosin-type dye (Bontron N-10: made by Orient Kagaku Kogyo K.K.) | 5 parts by weight |

The above ingredients were used to produce black fine particles having a volume average particle size of 11 µm in the same manner as the method for producing the Toner a2. To 100 parts by weight of this black fine particles was added 0.3 part by weight of hydrophobic silica (R972: made by Nippon Aerosil K.K.), and the mixture was treated at 1000 rpm for one minute by means of a Henschel mixer to give a positively chargeable toner. The obtained toner is referred to as "Toner b2".

Production of Toner c2

A polyester resin (softening point: 100° C., glass transition point: 58° C.) and a magenta pigment (C.I. Pigment Red 184) were introduced into a pressure kneader so that the ratio would be resin:pigment=7:3 by weight, and the mixture was kneaded. The kneaded product was cooled and then pulverized by means of a feather mill to give a pigment master batch.

The above polyester resin (93 parts by weight), the above master batch (10 parts by weight), and zinc salicylate complex (E-84: made by Orient Kagaku Kogyo K.K.) (2 parts by weight) were processed in the same manner as the method for producing the Toner a2, to give fine particles having a volume average particle size of 8.5 µm. To 100 parts by weight of this black fine particles were added 0.5 part by weight of hydrophobic silica (H-2000: made by Hoechst Japan K.K.) and 0.6 part by weight of titanium oxide fine particles (STT-30A: made by Titan Kogyo K.K.), and the mixture was treated at 1000 rpm for one minute by means of a Henschel mixer to give a magenta toner. The obtained toner is referred to as "Toner c2".

Example II-1 to Example II-22 and Comparative Examples II-1 to II-2

Developers for use in the Examples and the Comparative Examples were prepared by using the Carriers A2 to H2 and the Toners a2 to c2 obtained in the above process and combining them as shown in the following Table II-1 with the ratio (T/C) of the toner (T) to the carrier (C) being 6% by weight.

TABLE II-1

| | Carrier | Toner | T/C(%) |
|---|---|---|---|
| Example II-1 | A2 | a2 | 6 |
| Example II-2 | B2 | a2 | 6 |
| Example II-3 | C2 | a2 | 6 |
| Example II-4 | D2 | a2 | 6 |
| Example II-5 | G2 | a2 | 6 |
| Example II-6 | A2 | b2 | 6 |
| Example II-7 | B2 | b2 | 6 |
| Example II-8 | C2 | b2 | 6 |
| Example II-9 | D2 | b2 | 6 |
| Example II-10 | G2 | b2 | 6 |
| Example II-11 | A2 | c2 | 6 |
| Example II-12 | B2 | c2 | 6 |
| Example II-13 | C2 | c2 | 6 |
| Example II-14 | D2 | c2 | 6 |
| Example II-15 | G2 | c2 | 6 |
| Example II-16 | F2 | a2 | 6 |
| Example II-17 | F2 | b2 | 6 |
| Example II-18 | F2 | c2 | 6 |
| Example II-19 | F2 | c2 | 6 |
| Example II-20 | E2 | a2 | 6 |
| Comparative Example II-1 | H2 | a2 | 6 |
| Example II-21 | E2 | b2 | 6 |
| Comparative Example II-2 | H2 | b2 | 6 |
| Example II-22 | E2 | c2 | 6 |
| Comparative Example II-3 | H2 | c2 | 6 |

Evaluation II-1

The developers obtained in Examples II-6 to II-10, Examples II-17, Example II-21, and Comparative Example II-2 were each mixed for one hour by means of a roll mill. These developers were put into a copying machine EP-9765: make by Minolta K.K. to copy images with a B/W ratio of 15% on 300,000 sheets under an N/N environment (25° C., 50%) for visual evaluation of fogging on a white ground at an initial stage and at stages of 10,000 sheets (10K), 30,000 sheets (30K), 50,000 sheets (50K), 100,000 sheets (100K), 130,000 sheets (130K), 150,000 sheets (150K), 200,000 sheets (200K), 230,000 sheets (230K), 250,000 sheets (250K), and 300,000 sheets (300K). Also, 300,000 sheets were subjected to copy with images of a B/W ratio of 15% under an H/H environment (30° C. 80%) and under an L/L environment (10° C., 10%) for visual evaluation of fogging on a white ground at an initial stage and at stages of 50,000 sheets (50K), 100,000 sheets (100K), 150,000 sheets (150K), 200,000 sheets (200K), 250,000 sheets (250K), and 300,000 (300K) in the same manner. Evaluation results were ranked as follows.

⊚Rank 5 No fogging at all

○: Ranks 3 to 4 Fogging is not noticeable visually, but can be confirmed by a microscope or the like.

△: Rank 2 A little fogging is confirmed visually.

×: Rank 1 Much fogging is observed over the entire image. The results are shown in the following Table II-2.

300,000 sheets (300K) in the same manner. Evaluation results were ranked as follows in the same manner as the above Evaluation II-1. The results are shown in the above Table II-2.

Evaluation II-3

The developers obtained in Examples II-11 to II-15, Example II-18, Example II-22, and Comparative Example II-3 were each mixed for one hour by means of a roll mill. These developers were introduced into a copying machine CF-70: made by Minolta K.K. to copy images with a B/W ratio of 15% on 150,000 sheets under an N/N environment (25° C., 50%) for visual evaluation of fogging on a white ground at an initial stage and at stages of 10,000 sheets (10K), 30,000 sheets (30K), 50,000 sheets (50K), 100,000 sheets (100K), 130,000 sheets (130K), and 150,000 sheets (150K). Also, 150,000 sheets were subjected to copy with

TABLE II-2

Fogging (shown for N/N, H/H, and L/L environments, respectively)
("—" means that the evaluation was not conducted)

| | Copying machine | Initial stage | 10K | 30K | 50K | 100K | 130K | 150K | 200K | 230K | 250K | 300K |
|---|---|---|---|---|---|---|---|---|---|---|---|---|
| Example II-1 | Di-30 | ⊚⊚⊚ | ⊚—— | ⊚—— | ⊚⊚⊚ | ⊚⊚⊚ | ⊚—— | ⊚⊚⊚ | ⊚○○ | ⊚—— | ⊚○○ | ⊚⊚⊚ |
| Example II-2 | Di-30 | ⊚⊚⊚ | ⊚—— | ⊚—— | ⊚⊚⊚ | ⊚⊚⊚ | ⊚—— | ⊚⊚⊚ | ⊚⊚⊚ | ⊚—— | ⊚⊚⊚ | ⊚⊚⊚ |
| Example II-3 | Di-30 | ⊚⊚⊚ | ⊚—— | ⊚—— | ⊚—— | ⊚⊚⊚ | ⊚—— | ⊚⊚⊚ | ⊚⊚⊚ | ⊚—— | ⊚○○ | ⊚○○ |
| Example II-4 | Di-30 | ⊚⊚⊚ | ⊚—— | ⊚—— | ⊚⊚⊚ | ⊚⊚⊚ | ⊚—— | ⊚⊚⊚ | ⊚⊚⊚ | ⊚—— | ⊚○○ | ⊚○○ |
| Example II-5 | Di-30 | ⊚⊚⊚ | ⊚—— | ⊚—— | ⊚⊚⊚ | ⊚⊚⊚ | ⊚—— | ⊚○○ | ⊚○○ | ⊚—— | ⊚○○ | ⊚○○ |
| Example II-6 | EP-9765 | ⊚⊚⊚ | ⊚—— | ⊚—— | ⊚⊚⊚ | ⊚⊚⊚ | ⊚—— | ⊚⊚⊚ | ⊚○○ | ⊚—— | ⊚○○ | ⊚○○ |
| Example II-7 | EP-9765 | ⊚⊚⊚ | ⊚—— | ⊚—— | ⊚⊚⊚ | ⊚⊚⊚ | ⊚—— | ⊚⊚⊚ | ⊚⊚⊚ | ⊚—— | ⊚○○ | ⊚○○ |
| Example II-8 | EP-9765 | ⊚⊚⊚ | ⊚—— | ⊚—— | ⊚⊚⊚ | ⊚⊚⊚ | ⊚—— | ⊚⊚⊚ | ⊚⊚⊚ | ⊚—— | ⊚⊚⊚ | ⊚○○ |
| Example II-9 | EP-9765 | ⊚⊚⊚ | ⊚—— | ⊚—— | ⊚⊚⊚ | ⊚⊚⊚ | ⊚—— | ⊚⊚⊚ | ⊚⊚⊚ | ⊚—— | ⊚⊚⊚ | ⊚⊚⊚ |
| Example II-10 | EP-9765 | ⊚⊚⊚ | ⊚—— | ⊚—— | ⊚⊚⊚ | ⊚○○ | ⊚—— | ⊚⊚⊚ | ⊚○○ | ⊚—— | ⊚○○ | ⊚○○ |
| Example II-11 | CF-70 | ⊚⊚⊚ | ⊚—— | ⊚—— | ⊚⊚⊚ | ⊚⊚⊚ | ⊚—— | ⊚○○ | —— — | —— — | —— — | —— — |
| Example II-12 | CF-70 | ⊚⊚⊚ | ⊚—— | ⊚—— | ⊚⊚⊚ | ⊚⊚⊚ | ⊚—— | ⊚○⊚ | —— — | —— — | —— — | —— — |
| Example II-13 | CF-70 | ⊚⊚⊚ | ⊚—— | ⊚—— | ⊚⊚⊚ | ⊚⊚⊚ | ⊚—— | ⊚○⊚ | —— — | —— — | —— — | —— — |
| Example II-14 | CF-70 | ⊚⊚⊚ | ⊚—— | ⊚—— | ⊚—— | ⊚⊚⊚ | ⊚—— | ⊚○⊚ | ○○⊚ | —— — | —— — | —— — |
| Example II-15 | CF-70 | ⊚⊚⊚ | ⊚—— | ⊚—— | ⊚⊚⊚ | ⊚○⊚ | ⊚—— | ⊚○○ | —— — | —— — | —— — | —— — |
| Example II-16 | Di-30 | ⊚⊚⊚ | ⊚—— | ⊚—— | ⊚⊚⊚ | ⊚⊚⊚ | ⊚—— | ⊚⊚⊚ | ○○○ | ○—— | ○△△ | △×△ |
| Example II-17 | EP-9765 | ⊚⊚⊚ | ⊚—— | ⊚—— | ⊚⊚⊚ | ⊚⊚⊚ | ⊚—— | ⊚○⊚ | ○○○ | ○—— | △△△ | △×△ |
| Example II-18 | CF-70 | ⊚⊚⊚ | ⊚—— | ⊚—— | ⊚⊚⊚ | ⊚○○ | ○—— | ⊚×△ | —— — | —— — | —— — | —— — |
| Example II-20 | Di-30 | ⊚⊚⊚ | ⊚—— | ⊚—— | ⊚⊚⊚ | ⊚⊚⊚ | ⊚—— | ⊚⊚⊚ | ○△○ | ○—— | △×△ | △×× |
| Comparative Example II-1 | Di-30 | ⊚⊚⊚ | ⊚—— | ⊚—— | ⊚⊚⊚ | ⊚○○ | ○—— | ○△○ | △×△ | △—— | ××× | ××× |
| Example II-21 | EP-9765 | ⊚⊚⊚ | ⊚—— | ⊚—— | ⊚⊚⊚ | ⊚○⊚ | ⊚—— | ⊚○○ | ⊚△⊚ | △—— | △△△ | ××× |
| Comparative Example II-2 | EP-9765 | ⊚⊚⊚ | ⊚—— | ⊚—— | ⊚⊚⊚ | ⊚○○ | ⊚—— | ○△○ | ⊚×△ | △—— | △×△ | ××× |
| Example II-22 | CF-70 | ⊚⊚⊚ | ⊚—— | ⊚—— | ⊚⊚⊚ | ⊚○○ | ○—— | ⊚△△ | —— — | —— — | —— — | —— — |
| Comparative Example II-3 | CF-70 | ⊚⊚⊚ | ⊚—— | ⊚—— | ○○○ | ○△○ | △—— | △×× | —— — | —— — | —— — | —— — |

Evaluation II-2

The developers obtained in Examples II-1 to II-5, Example II-16, Example II-20, and Comparative Example II-1 were each mixed for one hour by means of a roll mill. These developers were put into a copying machine Di-30: made by Minolta K.K. to copy images with a B/W ratio of 15% on 300,000 sheets under an N/N environment (25° C., 50%) for visual evaluation of fogging on a white ground at an initial stage and at stages of 10,000 sheets (10K), 30,000 sheets (30K), 50,000 sheets (50K), 100,000 sheets (100K), 130,000 sheets (130K), 150,000 sheets (150K), 200,000 sheets (200K), 230,000 sheets (230K), 250,000 sheets (250K), and 300,000 sheets (300K). Also, 300,000 sheets were subjected to copy with images of a B/W ratio of 15% under an H/H environment (30° C., 80%) and under an L/L environment (10° C., 10%) for visual evaluation of fogging on a white ground at an initial stage and at stages of 50,000 sheets (50K), 100,000 sheets (100K), 150,000 sheets (150K), 200,000 sheets (200K), 250,000 sheets (250K), and 300,000 sheets (300K) in the same manner. Evaluation results were ranked as follows in the same manner as the above Evaluation II-1. The results are shown in the above Table II-2.

Evaluation II-4

The developers obtained in Examples II-11 to II-15, Example II-18, Example II-22, and Comparative Example II-3 were each mixed for one hour by means of a roll mill. These developers were put into a copying machine CF-70: made by Minolta K.K. to copy images with a B/W ratio of 15% on 150,000 sheets under an N/N environment (25° C., 50%) for evaluation of toner flying at an initial stage and at stages of 10,000 sheets (10K), 30,000 sheets (30K), 50,000 sheets (50K), 100,000 sheets (100K), 130,000 sheets (130K), and 150,000 sheets (150K). The toner flying was ranked as follows by measuring an amount of toner received by a toner collecting portion in the copying machine.
Toner flying
⊚: Amount of toner being not more than 5 mg/k
○: Amount of toner being more than 5 mg/k and not more than 10 mg/k
Δ: Amount of toner being more than 10 mg/k and not more than 20 mg/k
×: Amount of toner being more than 20 mg/k ("k" representing 1000)

The results are shown in the following Table II-3.

TABLE II-3

|  | Copying machine | Amount of Toner flying | | | | | | |
|---|---|---|---|---|---|---|---|---|
|  |  | Initial stage | 10K | 30K | 50K | 100K | 130K | 150K |
| Example II-11 | CF-70 | ⊚ | ⊚ | ⊚ | ⊚ | ⊚ | ⊚ | ⊚ |
| Example II-12 | CF-70 | ⊚ | ⊚ | ⊚ | ⊚ | ⊚ | ⊚ | ⊚ |
| Example II-13 | CF-70 | ⊚ | ⊚ | ⊚ | ⊚ | ⊚ | ⊚ | ⊚ |
| Example II-14 | CF-70 | ⊚ | ⊚ | ⊚ | ⊚ | ⊚ | ⊚ | ⊚ |
| Example II-15 | CF-70 | ⊚ | ⊚ | ⊚ | ⊚ | ⊚ | ⊚ | ⊚ |
| Example II-18 | CF-70 | ⊚ | ⊚ | ⊚ | ⊚ | ⊚ | ○ | ○ |
| Example II-22 | CF-70 | ⊚ | ⊚ | ⊚ | ⊚ | ⊚ | ○ | Δ |
| Comparative Example II-3 | CF-70 | ⊚ | ⊚ | ○ | ○ | Δ | × | × |

As shown above, the present invention provides carriers having an excellent charging stability and raising substantially no problems such as fogging and toner flying even after a long-term use.

What is claimed is:

1. A binder carrier comprising:
a magnetic particle; and
a binder resin comprising a copolymer containing an ethylenic unsaturated nitrile as a monomer component.

2. A binder carrier of claim 1, in which the ethylenic unsaturated nitrile is represented by the following formula (1):

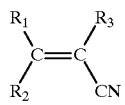

(1)

in which $R_1$, $R_2$, and $R_3$ are independently a hydrogen atom or an alkyl group.

3. A binder carrier of claim 1, in which the copolymer contains the ethylenic unsaturated nitrile at a content of 50 to 80 wt %.

4. A binder carrier of claim 1, in which the copolymer is a copolymer of the ethylenic unsaturated nitrile with a radical-polymerizable organic monomer.

5. A binder carrier of claim 1, in which the binder resin has a melt index of 1 to 50.

6. A binder carrier of claim 1, in which the copolymer contains a rubber component at a content of not more than 50 wt %.

7. A binder carrier of claim 1, in which the magnetic particle has an average primary particle size of not more than 5 μm, the magnetic particle being contained at 100 to 900 parts by weight relative to 100 parts by weight of the binder resin.

8. A binder carrier of claim 1, having a volume average particle size of 20 to 100 μm.

9. A binder carrier of claim 1, having a saturation magnetization of 30 to 80 emu/g.

10. A binder carrier of claim 1, in which the binder resin contains at least a resin selected from the group consisting of a polyester resin, a styrene-acrylic copolymer resin, a poly(meth)acrylic resin, and an epoxy resin.

11. A binder carrier comprising:
a magnetic particle; and
a binder resin comprising a copolymer containing an ethylenic unsaturated nitrile as a monomer component and a thermoplastic silicone-modified acrylic resin.

12. A binder carrier of claim 11, in which the ethylenic unsaturated nitrile is represented by the following formula (1)

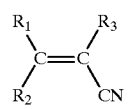

(1)

in which $R_1$, $R_2$, and $R_3$ are independently a hydrogen atom or an alkyl group.

13. A binder carrier of claim 11, in which the copolymer is a copolymer of the ethylenic unsaturated nitrile with a radical-polymerizable organic monomer.

14. A binder carrier of claim 11, in which the silicone-modified acrylic resin is a copolymer of a polydiorganosiloxane macromer having an acrylic functional group with a radical-polymerizable organic monomer.

15. A binder carrier of claim 11, in which the copolymer is contained at a content of 5 to 95 wt % relative to the binder resin.

16. A binder carrier of claim 11, in which the silicone-modified acrylic resin is contained at a content of 5 to 80 wt % relative to the binder resin.

17. A binder carrier of claim 11, in which the copolymer contains a rubber component.

18. A binder carrier of claim 11, in which the magnetic particle has an average primary particle size of not more than 5 μm, the magnetic particle being contained at an amount of 100 to 900 parts by weight relative to 100 parts by weight of the binder resin.

19. A binder carrier of claim 11, in which the carrier has a volume average particle size of 20 to 100 μm.

20. A binder carrier of claim 11, in which the carrier has a saturation magnetization of 30 to 80 emu/g.

21. A developer comprising:
a negatively chargeable toner; and
a carrier containing a magnetic particle and a binder resin comprising a copolymer containing an ethylenic unsaturated nitrile as a monomer component.

22. A developer of claim 21, in which the binder resin contains the copolymer at a content of not less than 40 wt %.

23. A developer comprising:

a negatively chargeable toner; and a carrier containing a magnetic particle and a binder resin comprising a copolymer containing an ethylenic unsaturated nitrile as a monomer component and a thermoplastic silicone-modified acrylic resin.

24. A developer of claim 23, in which the copolymer is contained at a content of 5 to 95 wt % relative to the binder resin.

25. A developer of claim 23, in which the silicone-modified acrylic resin is contained at a content of 5 to 80 wt % relative to the binder resin.

* * * * *